United States Patent [19]

Ostfeld et al.

[11] 3,810,153

[45] May 7, 1974

[54] DATA HANDLING SYSTEM

[76] Inventors: David Martin Ostfeld, 4802 Irogene, Houston, Tex. 77035; Mauro Guiseppe Togneri, 7626 Westwind Ln., Houston, Tex. 77071

[22] Filed: Jan. 3, 1972

[21] Appl. No.: 215,128

Related U.S. Application Data

[63] Continuation of Ser. No. 849,287, Aug. 6, 1969, abandoned.

[52] U.S. Cl.. 340/347 AD, 179/15 BS, 340/347 DA

[51] Int. Cl. .......................... H03k 13/00, H04j 3/00

[58] Field of Search .............. 340/347 AD, 347 DA; 179/15

[56] References Cited

UNITED STATES PATENTS

| | | | |
|---|---|---|---|
| 3,594,765 | 7/1971 | Lerouge | 340/347 AD |
| 3,639,741 | 2/1972 | Carrick | 340/347 AD |
| 3,588,876 | 6/1971 | Chatelon | 340/347 AD |

*Primary Examiner*—Daryl W. Cook
*Attorney, Agent, or Firm*—Pugh & Laiche

[57] ABSTRACT

A data handling system wherein data usually in the form of voltage signals at data points or stations are compared to a transient reference variable, e.g., a linear ramp function of voltage against time, and the voltage data translated or encoded to the time reference data which is then transmitted, reconstructed and used, the system being generally illustrated (FIG. 1); the system is particularly applied to an analog data acquisition system (FIG. 2), a digital computer output system (FIG. 3) and a digital data handling system (FIG. 4), among others.

15 Claims, 4 Drawing Figures

DATA HANDLING SYSTEM

REFERENCE TO RELATED APPLICATION

This application is a continuation of the prior application entitled "Data Handling System," Ser. No. 849,287, filed Aug. 6, 1969, abandoned in favor of this application.

BACKGROUND AND SUMMARY OF THE INVENTION

Generally speaking, the present invention relates to a data handling system which includes two or more data points, and the invention provides a unique and particularly useful way of translating, gathering and/or evaluating the values of the data at those points.

Heretofore, several systems for handling data have been taught by the prior art. Probably the best known and most widely used system is one in which the data at each point is in the form of a voltage or current signal which directly or by means of an amplifier is fed over transmission lines in the same form, namely, as a voltage or current signal. This voltage or current data is then directly read and utilized. However, all of these prior art systems have substantial drawbacks, usually involving greater cost and less reliability, both of which the present invention helps to overcome.

In the present invention, the value of the data at each point is translated, gathered and/or evaluated according to its relationship to a varying reference signal or transient reference variable which has therein at least two variables. The first variable is normally a magnitude variable, for example, a voltage signal varying in magnitude, and the second a lime variable. An example of such a varying reference signal is a voltage ramp function, wherein the magnitude of the voltage is directly proportional to time, thereby producing an inclined linear or ramp function. In the present invention, the value at each data point is determined by comparing its magnitude value with the value of the magnitude variable correlated with and keyed to its time coordinant, and the data value translated to the keyed time coordinant. This approach to determining and translating the values of the data is a basic element in the present invention.

An exemplary application of the principles of the present invention is one wherein a set voltage ramp function is fed to all data points simultaneously, each bit of data being in the form of a voltage signal. At each data point there is included a null indicator for comparing the reference voltage to the data voltage. At that point in time wherein the comparator indicates a null condition, that is, the reference voltage and the data voltage are equal, the occurrence of the null condition is signalled back to a central data determining, gathering and/or evaluating station. Thus by knowing at what point of time a data point signalled out, the value of the data at that point is known and fixed. The voltage data has thus been transformed to time related data and the time related data is what is transmitted, as opposed to the data voltages themselves.

Because time related data is transmitted, as opposed to the value of the data directly, transmission can be accomplished through the transmission of synchronizing pulses. The transmission and conversion rate is thus independent of the number of original data values to be measured and transmitted.

Moreover, there need not be a dimensionally direct correspondence between the reference variable and the physical variable whose magnitude is to be measured and transmitted. Part of the uniqueness of the use of the transient reference variable is the ability of this system to simultaneously compare all physical variables, whose magnitudes are to be measured and transmitted, during the same transient of the reference variable, allowing as indicated above the transmission of synchronizing pulses. The only dimensional requirement between the reference variable and the physical variable to be measured is that there exists a mathematically expressible relationship between the dimensions of the two. The accuracy of the system is limited only by the technique of comparison.

The variable reference signal need not of course be a ramp function such as $$V = kt + C_o$$

where $V$ is voltage, $k$ is some constant, $t$ is time and $C_o$ is a reference constant. Other examples of suitable transient reference variable functions are the appropriate value ranges of a quadratic function such as $$V = k_1t^2 + k_2t + C_o$$

wherein $k_1$ and $k_2$ are constants, or a sinusoidal function such as $$V = k \sin (w\, t + d) + C_o$$

wherein $w$ and $d$ are constants. The primary consideration is that the transient reference variable have at least two parameters, an independent driver such as time and a dependent reference signal such as voltage, with a set functional relationship between the two.

When applied to the electrical data field, the system of the present invention provides a relatively low cost, high reliability set of devices capable of scanning analog and digital data at any commercially useful signal level and accuracy. The devices are self-contained and self-sustaining, capable of design, with full modularity through the use of solid state integrated circuitry, of immediate interface, on a direct address basis, with any computer system now known and used and is easily adaptable to the special computer requirements of any present manufacturer's direct memory access linkage. The system easily lends itself for providing various options to handle any voltage or current range and to give extended accuracy, added redundancy for reliability and input variable characterization for special applications.

DESCRIPTION OF THE PREFERRED EMBODIMENTS

General System

Figure 1:
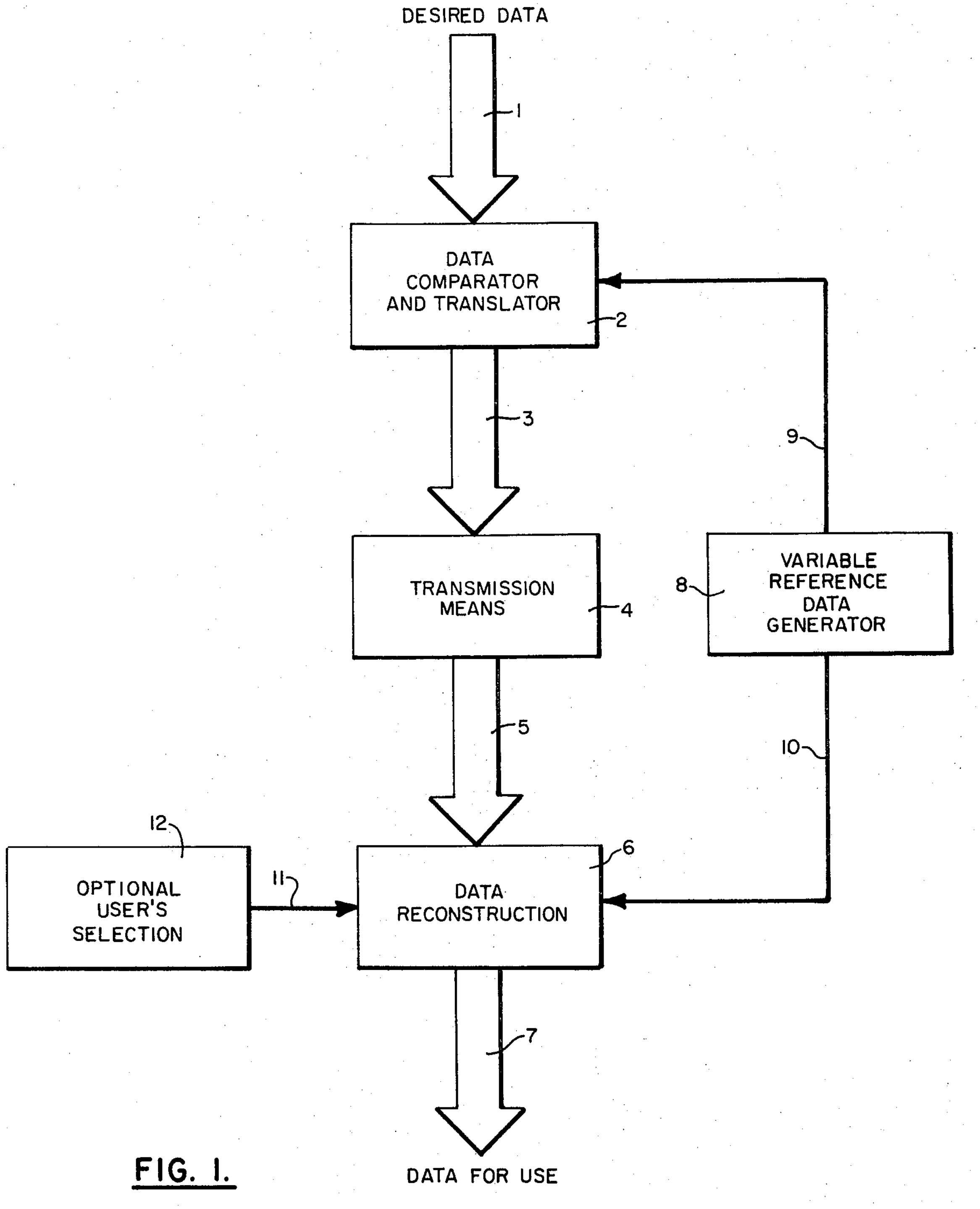
FIG. 1 is a schematized, block diagram of the system of the present invention in generalized form.

FIG. 1 illustrates the data handling system of the present invention in generalized block form. Generally speaking the system includes a series of data points having data 1 which is desired to be determined, gathered and/or evaluated. The data 1 can be in any form, for example, voltage signals being produced by transducer elements, and can be relating any sort of value or condition, for example, measuring the temperature, velocity or pressure of a fluid or the position of a valve. The data 1 can be digital or analog and raw or semi-converted. The data 1 is basically information to be handled and transmitted.

In order to handle the desired data 1, the data 1 is translated to encoded data 3 by means of data comparator and translator 2. This translation occurs by comparing the desired data 1 with a transient reference variable generated by the variable reference data generator 8. The transient reference variable of generator 8 contains at least two parameters — an independent driver parameter, for example, time, and a dependent reference parameter, for example, voltage — the parameters having a set functional relationship between themselves. The functional relationship can be, for example, a linear ramp function, a quadratic function or a sinusoidal function, it being particularly important that the functional relationship be set, pre-determined and, preferrably, easily and quickly repeatable but non-repetitive of the ranged values during any particular cycle.

The reference data of the transient reference variable is fed to comparator 2 by means of line 9, which can be either a single line or a plurality of lines as needed. The reference data of the transient reference variable is used to determine the value of the desired data 1 in the following manner. The magnitude of the desired data 1 is compared to the magnitude of the varying dependent reference parameter, and, when a particular, set relationship exists, for example, equality of the two magnitudes, that condition is noted with respect to the independent drive parameter and keyed thereto.

For illustration purposes it may be supposed that: a channel of desired data 1 is registering at one volt, the functional relationship between the parameters of the transient reference variable is a linear ramp voltage function going from zero to four volts in one-tenth of a second, and the comparator is a null or equality indicator. In such a situation, the comparator will indicate a null condition at one-fortieth of a second from time reference zero and thus the desired data of one volt can be and is translated into a time referenced data of one-fortieth of a second. On the other hand, if the time referenced data is one-twentieth of a second, the original or desired data would have been two volts.

The comparator and translator 2 thus, by using a predetermined relationship between the reference data and the desired data 1, e.g., a null or equality, translates the desired data to the dimension of the driver parameter by indicating when that relationship or condition exists. The encoded data 3 is hence the desired data 1 correlated and keyed to the driver parameter.

The encoded data 3 is then transmitted by transmission means 4 to whereever the desired data 1 is needed. The transmission means 4 can be any suitable system, for example, telephone lines, radio, microwave beams, laser beams, etc., and is primarily designed to get the encoded data 3 from one place to another as encoded data 5. Data 5 is thus the same as or equivalent to data 3.

Once the encoded data 5 is received in the desired place, it is reconstructed or decoded either partially or completely by data reconstructor 6 to produce data 7 for use. The data reconstructor 6 is tied to the variable reference data generator 8 by means of line 10, which like line 9 can be either a single line or a plurality of lines. by a re-comparison or an inverse translation (inverse in form to that occurring at comparator 2), the encoded data 5 is reconstructed to reflect the desired data 1 as data 7. Data 7 is made completely independent of the reference data produced by variable reference data generator 8, so that data 7 is a mathematically expressable translation of desired data 1. In its simplest form data 7 is identical to data 1. Data 7 can be either discrete or continuous, or digital or analog as desired.

As an optional element of the general system a user's selection system 12 can be included which acts on the data reconstructor 6 by means of data 11. The user's selection system 12 allows a user to select or manipulate data 7 and operates on reconstructor 6 to determine the way data 7 is outputted.

The system's input is designed to accept conventional instruments with full resolution and accuracy. Zero to 5 volts is standard, although of course all other options are available, for example, 100 millivolts to 100 volts maximum scale and others are readily available. Likewise in the digital portion of the system a ten bit binary code will provide standard accuracy although a larger number or bits are available for extended accuracy, up to the state of the art.

Although the general system has been described with particular reference to an electrical system, it should be understood that the system is likewise applicable to other types of systems as well, for example, fluidics and hydraulics.

Having described the system generally, its application to several embodiments or types of electrical systems will now be described in greater detail. To correlate the applications of the general system to the system itself, like reference numbers are used throughout in FIGS. 2 – 4 with the number of the figure being placed in front of the number of the analogous element in FIG. 1. Thus, in FIG. 2 the data stations measuring the voltages $V_{IN}$ which are analogous to the desired data 1 of FIG. 1 is enumerated as 21 and so on. It is further noted that, rather than the repetitive illustrating of each and every element of each series of types of elements, only three of each such elements are illustrated, namely elements 1, 2 and *m* or n.

Analog Data Acquisition System

Figure 2:
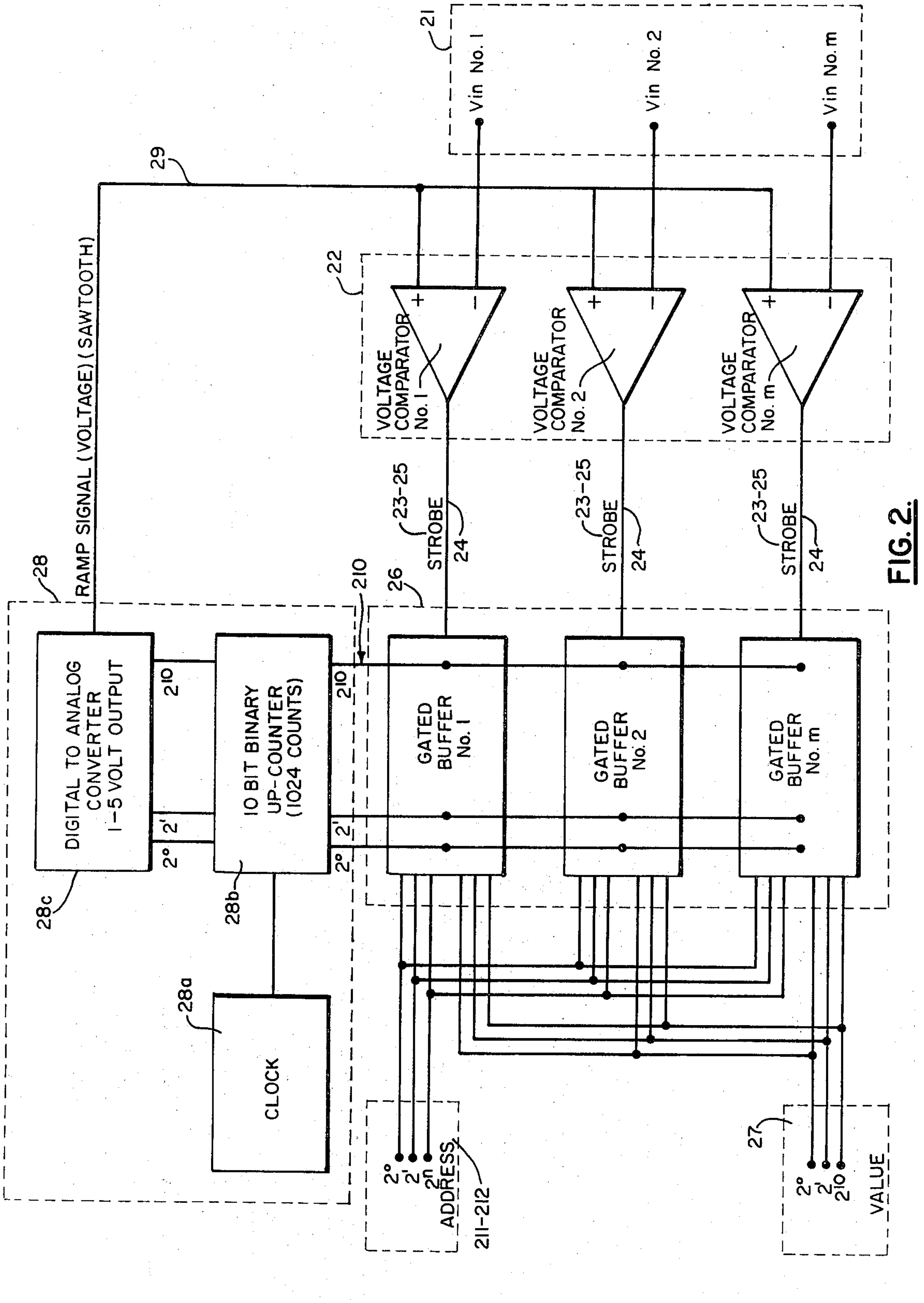
FIG. 2 is a schematic diagram of an analog data acquisition system as a first embodiment of the generalized system of FIG. 1.

FIG. 2 illustrates the system of the present invention as applied to a data acquisition system which is basically an input system and wherein there are a series of data stations 21 which are measuring desired values in terms of voltages $V_{IN}$. A typical example of such a data acquisition system is a control and monitoring system for an industrial plant wherein the data stations 21 (1 through *m*) would be measuring such desired values as the position of valves, the temperature, pressure and composition of fluids, etc. Typical voltage ranges in such an application of the voltages $V_{IN}$ would be 1 to 5 volts.

In order to translate or convert the voltages $V_{IN}$ to a time reference signal, a saw-tooth or repetitive ramp function signal is simultaneously fed by means of line 29 to a series of comparators 22 (1 through *m*) to which are also fed the voltages $V_{IN}$ at their other terminals. The saw-tooth signal for this particular embodiment has a voltage amplitude of four volts and a frequency of 10 cycles per second. The comparators are used to detect during each cycle when the magnitude of the saw-tooth signals equals the magnitude of $V_{IN}$ at each station. Upon the detection of this equality, the comparator for that station transmits a strobe pulse or signal 23 – 25 by means of transmission line 24 to its respective gated buffer 26 (1 through *m*). Thus during each one-tenth of a second cycle of the saw-tooth signal, the discrete voltages $V_{IN}$ of the data stations 21 are converted into time referenced parallel synchronous strobe signals or pulses which are fed to the gated buffers 26.

The saw-tooth signal is produced by the variable reference data generator 28 which comprises a clock 28*a* driving a 10 bit binary up-counter 28*b* having 1024 bits in its up-count. One output of the up-counter 28*b* is fed to an appropriate digital-to-analog converter 28*c* which changes the output of the up-counter to its analog, namely, the saw-tooth signal.

Another output of the binary up-counter 28*b* is likewise fed by lines 210 to the gated buffers 26 which comprises a set of gates. When a strobe pulse 23–25 is received by a gated buffer 26, the discrete counting of the binary up-counter to that gated buffer is stopped and that particular count is stored by that gated buffer for the rest of the cycle.

In order to utilize the information which is stored in the gated buffers 26, that information being the encoded values of the voltages $V_{IN}$, the outputs of the gated buffers are connected to the value system 27 of an appropriate computer. When such information is desired, the computer through its address system 211–212 asynchronously addresses through a parallel addressing scheme by means of the ADDRESS LINES 2 through 2 the gated buffers 26. As each gated buffer 26 has a unique address, one or more gated buffers 26 can be selectively activated. Upon the detection by a gated buffer of its unique address, that gated buffer places its contents or stored value on the input lines to the value system 27 of the computer.

The above-described data acquisition system has the accuracy of a ten bit analog to digital voltage detection scheme (or 1 part in 1024) measuring the value of each voltage $V_{IN}$ 10 times per second. For higher order accuracy, a higher number of digital bits could of course be used. The number of inputs of voltages $V_{IN}$ is limited by the driving capabilities of the digital to analog converter 28c and the binary up-counter 28*b*. It is estimated that the above-described system could handle up to 10,000 inputs.

Digital Computer Output System

Figure 3:
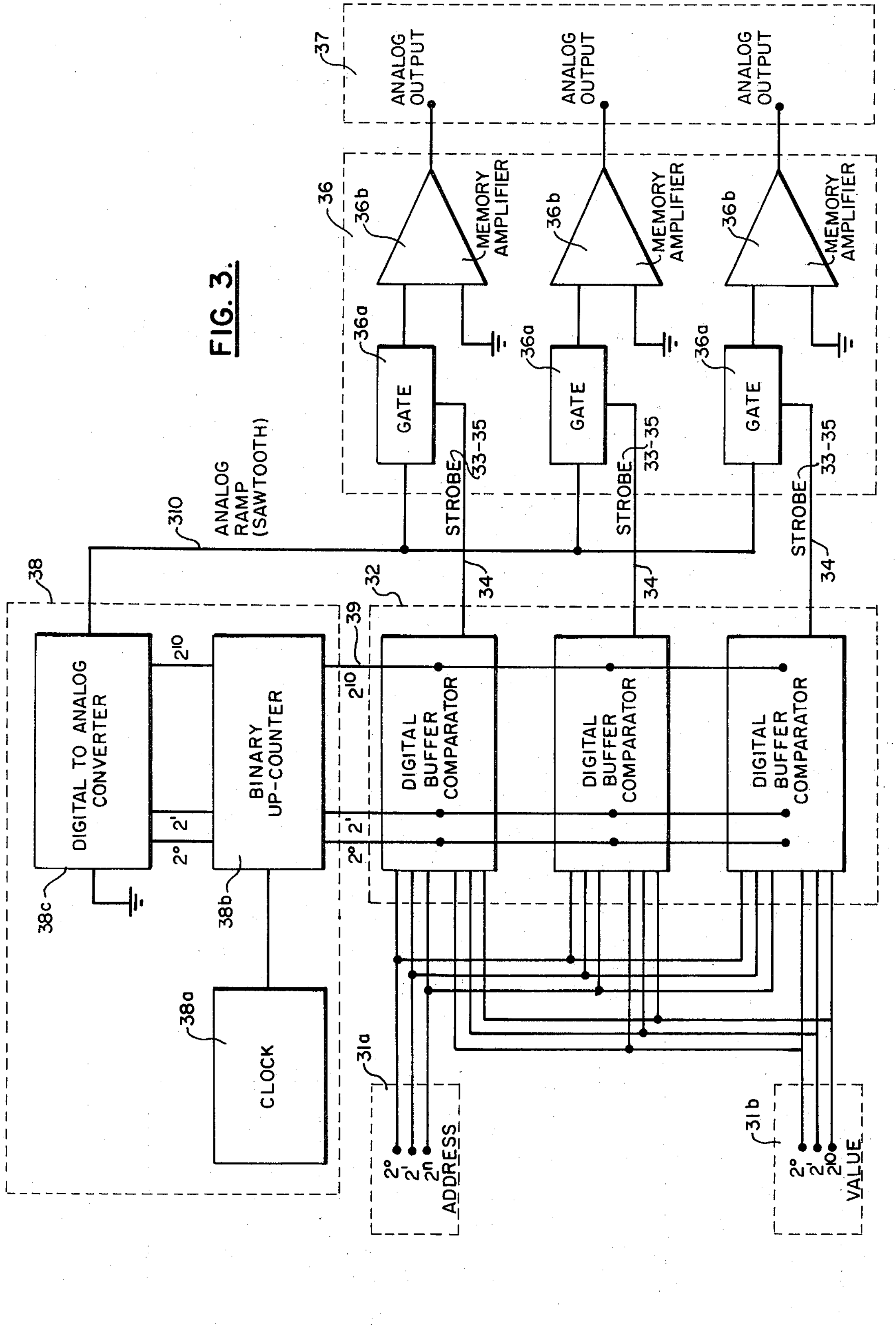
FIG. 3 is a schematic diagram of a digital computer output system as a second embodiment.

FIG. 3 illustrates the system of the present invention as applied to a digital computer output system wherein a digital computer is programmed to feed a selected set of computer voltage values to an output system 37. each value having a unique address or identification. The programmed address is contained in the address system 31a of the computer, and the voltage values corresponding to this address are contained in the value system 31b. Both the programmed address and the voltage values are fed in digital form to a set of digital buffer comparators 32, each having its own unique address corresponding to the addresses of the voltage valves.

As discussed with reference to element 28 of FIG. 2, a variable reference generator 38 produces at one output a repeating digital up-count of 1024 counts and at a second output its equivalent analog, namely a saw-tooth signal. By means of transmission lines 39 the digital up-count from generator 38 is simultaneously fed to all the digital buffer comparators 32. When the values of the digital up-count and the information from the computer are the same at a buffer comparator, a strobe pulse is generated and transmitted by transmission line 34 to its respective data reconstructor 36.

Each data reconstructor 36 contains a gate 36a and a memory amplifier 36b. The reference data generator 38 continuously feeds its saw-tooth signal simultaneously to all the gates 36a and, when a gate receives a strobe pulse from its buffer comparator, that gate opens and the voltage value of the saw-tooth signal at that point is fed to the memory amplifier associated with that gate. The memory amplifier then holds that voltage value for that cycle of operation and feeds it to its output 37.

The various digital voltage values of the computer 31 are thus fed to the outputs 37 after being translated, transmitted and reconstructed. Expressed differently and more abstractly, a reference variable is put into transience between two prefixed magnitudes and its discrete value is compared with a predetermined value for each desired output. When the magnitude of the reference variable is the same as the magnitude of the predetermined value, the reference variable is allowed to be applied to the output.

Digital Data Handling System

Figure 4:
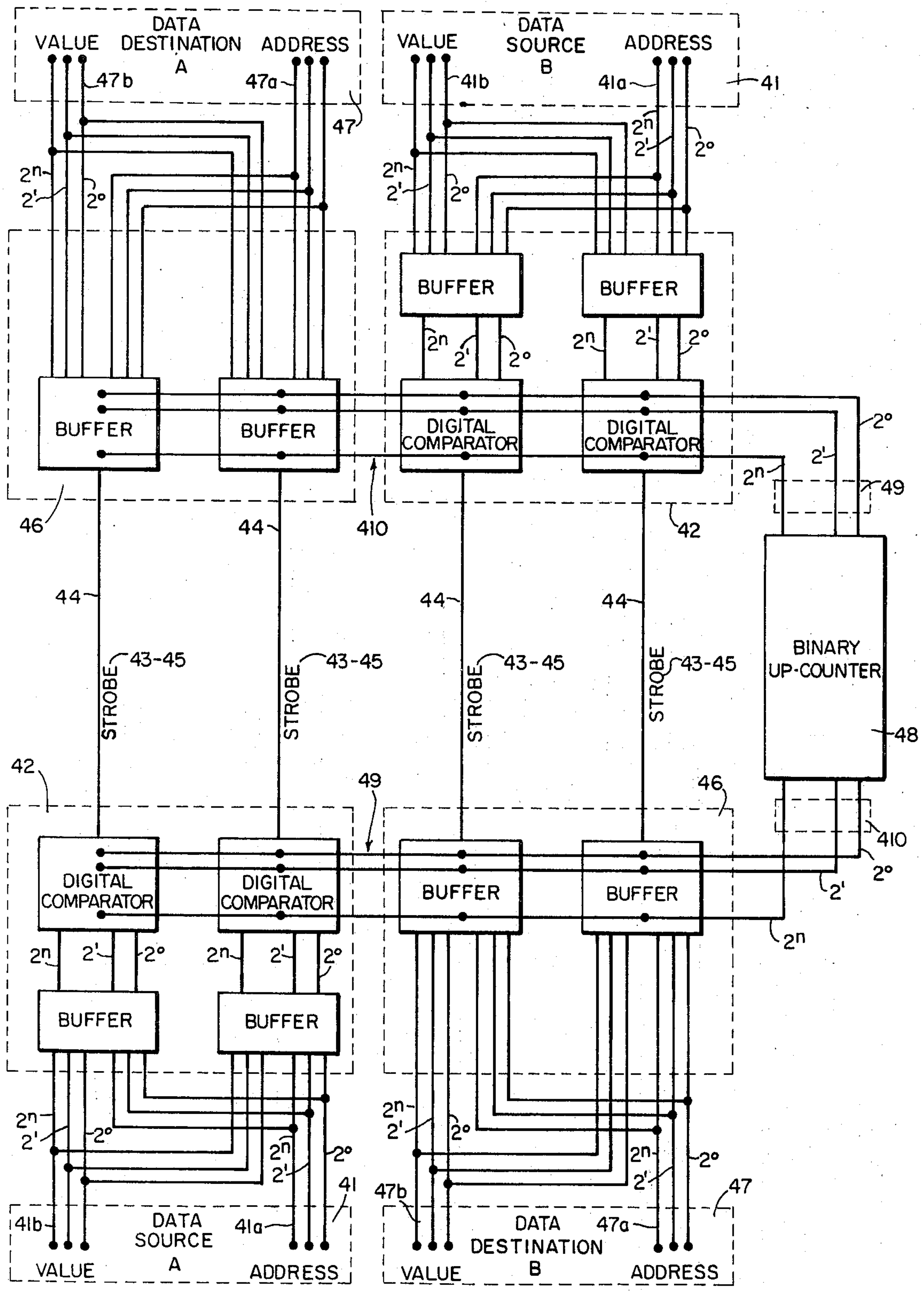
FIG. 4 is a schematic diagram of a Bidirectional digital data handling system as a third embodiment.

FIG. 4 illustrates the system of the present invention as applied to a digital data handling system wherein both input A and output B subsystems are combined and all data throughout the system is in digital form.

Digital data having a unique address or identification 41*a* and value or content 41*b*, is fed from data source A to data destination B. The presence of address 41*a* from data source 41 causes the value at 41*b* to be stored in the related buffer carrying the same address as the data.

A digital up-counter 48 generates a digital repetitive ramp signal by means of transmission lines 49, the digital up-count from counter 48 is fed simultaneously to all digital buffer comparators 42.

When the values of the digital up-count and the data stored in the buffer are the same at a buffer comparator, a strobe pulse 43–45 is produced by that buffer comparator and transmitted by transmission line 44 to its respective buffer 46. By means of transmission line 41o the digital count generated by counter 48 is simultaneously fed to all buffers 46.

When a strobe signal 43–45 from buffer comparator 42 reaches the related buffer 46 the count generated by counter 48 is stored at that point in buffer 46 and held until a new strobe pulse occurs.

When the proper address is present at 47*a* the value related to that address is available at 47*b*.

Having described the foregoing it should be noted that the three embodiments of FIGS. 2–4 are just exemplary of the many possible embodiments or applications of the system of the present invention. Hence the details of each should be considered merely illustrative, the variations possible under the basic principles of this pioneering invention being practically limitless.

What is claimed as invention is:

1. A data transmission system comprising:

a multiple number of data stations containing physical input variables whose magnitudes are to be evaluated;

time reference signal source means for producing a transient reference signal having at least two variables therein, a magnitude variable and a time base reference variable;

comparison means for comparing said physical input variables and said transient reference signal and for further determining when in respect to said time base reference variable a particular, predesigned relationship exists between the magnitudes of said physical variables and the magnitude of said magnitude variable;

translating means for producing correlation data containing the correlated values of the said input variables in the form of pulses based on the time base reference variable and the input variables at the occurrence of said particular, predesigned relationship, the correlation being the position of the correlation pulse in the time frame of the reference variable;

transmission means for transmitting said correlation pulses from said translating means to reconstruction means, said correlation being maintained throughout the transmission; and reconstruction means at the location the data is to be received for use for taking the transmitted correlation data and reconstructing it through the use of the time base reference variable into the data form desired for use, thereby producing a set of output values directly related to the magnitudes of said physical input variables.

2. The system of claim 1 wherein said reconstruction means includes a gated buffer system comprising a buffer storage system controlled by a gate system, said correlation data being fed to said gate system, and said transient reference signal (or its equivalent) being fed to said buffer storage system when said correlation data opens said gate, whereby the corresponding magnitude of said transient reference signal is stored in said storage system.

3. The system of claim 2 wherein the same reference signal means drives both said comparison means and said reconstruction means.

4. The system of claim 2 wherein each of said data stations has its own corresponding comparison means and reconstruction means, the corresponding sets of said comparison means and said reconstruction means being connected together in parallel.

5. The system of claim 4 wherein:

said transient reference signal is a voltage against time; said physical variables are in the form of voltage signals; said comparison means comprise a set of voltage comparators, one for each data station; and said correlation data comprise strobe signals produced at particular points in time corresponding to when the voltage at the data station equals the voltage of said transient reference signal.

6. The system of claim 2 wherein there is further included:

discrete address system means for requesting the stored contents of said buffer storage system; and discrete value system means for reading the stored contents of said buffer storage system.

7. The system of claim 1 wherein:

said data stations comprise a series of gated buffers, the magnitude values of said physical variables being stored in said buffers;

said comparison means likewise includes said gated buffers; and said correlation data comprise strobe signals produced at particular points in time corresponding to when the magnitude of the stored value in a gated buffer equals the magnitude variable of said transient reference signal.

8. The system of claim 7 wherein said reconstruction means comprise:

a reference signal source for producing a transient reference signal identical to or a definite function of the transient reference signal driving said comparison means; and a series of memory amplifiers and a series of gates connected together in parallel sets; said transmission means feeding said strobe signals to said gates; whereby, when a strobe signal reaches its corresponding gate and thereby opens it, the transient reference signal is fed to the corresponding memory amplifier and there stored until the gate is again opened by a strobe signal.

9. The system of claim 7 wherein there is further included:

discrete address system means for requesting storage of values in said data stations; and discrete value system means for generating the values to be stored in said data stations.

10. The system of claim 9 wherein said reconstruction means includes a gated buffer system comprising a buffer storage system controlled by a gate system, said correlation data being fed to said gate system, and said transient reference signal (or its equivalent) being fed to said buffer storage system when said translated data opens said gate, whereby the corresponding magnitude of said transient reference signal is stored in said storage system; and wherein there is further included a second discrete address system and a second discrete value system, these systems providing means for requesting the stored contents of said buffer storage system and means for reading the stored contents of said buffer storage system, respectively.

11. The system of claim 10 wherein the same reference signal means drives both said comparison means and said reconstruction means.

12. The system of claim 11 wherein said reference signal means is a digital counter and said system is a digital system.

13. The system of claim 1 wherein said system is an electrical system, said transient reference signal is a repeating, ramp signal of voltage against time, said correlation data is a set of timed, strobe signals, and said particular, predesigned relationship is one of equality.

14. The method of transmitting input data from one location to another comprising the steps of:

a. feeding the input data to comparison stations;

b. feeding a known, predetermined transient reference signal having at least two variables therein, a magnitude variable and a time base reference variable, to the same comparison stations;

c. comparing the magnitude of the input data to the magnitude variable of the transient reference signal;

d. producing a new, pulse data signals which are dependent on the transient reference signal when a certain, predesigned relationship exists between the magnitudes of the input data and the magnitude of the magnitude variable and is correlated to said true base reference variable, said new, pulse data signals containing the same magnitude information of said input data although in a different form;

e. transmitting said pulse data signals to a reconstruction station, the correlation between said pulse data signals and the transient reference signal being maintained throughout the transmission; and f. reconstructing the values of said input data through the use of the same transient reference signal or another reference signal which is a direct function of said transient reference signal, thereby producing a second set of values directly related to said input data.

15. The method of claim 14 wherein said steps are performed by electrical means, all of the different data forms are electrical signals, said transient reference signal is an electrical one in which said reference variable is time, said certain, predesigned relationship is one of equality, and said new data signal is produced in the form of a time related pulse strobe signal.

* * * * *